(12) United States Patent
Kato et al.

(10) Patent No.: US 7,561,931 B1
(45) Date of Patent: Jul. 14, 2009

(54) SOUND PROCESSOR

(75) Inventors: Shuhei Kato, Kusatsu (JP); Koichi Sano, Kusatsu (JP)

(73) Assignee: SSD Company Limited, Kusatsu-shi (JP)

( * ) Notice: Subject to any disclaimer, the term of this patent is extended or adjusted under 35 U.S.C. 154(b) by 841 days.

(21) Appl. No.: 09/636,591

(22) Filed: Aug. 10, 2000

(51) Int. Cl.
*G06F 17/00* (2006.01)

(52) U.S. Cl. .......................................... 700/94; 381/119

(58) Field of Classification Search .................... 700/94; 381/119, 104, 1, 17–19, 22–23; 84/600–602, 84/604; 341/110, 126, 144; 369/4
See application file for complete search history.

(56) References Cited

U.S. PATENT DOCUMENTS

| | | | | |
|---|---|---|---|---|
| 3,512,152 A | * | 5/1970 | Huynh et al. ................ | 341/164 |
| 4,815,352 A | * | 3/1989 | Tsukamoto et al. ........... | 84/617 |
| 5,046,004 A | * | 9/1991 | Tsumura et al. .............. | 364/419 |
| 5,402,499 A | * | 3/1995 | Robison et al. .............. | 381/119 |
| 5,532,765 A | * | 7/1996 | Inoue et al. .................. | 348/807 |
| 5,659,466 A | * | 8/1997 | Norris et al. .................. | 700/94 |
| 5,874,910 A | * | 2/1999 | Cooper ....................... | 341/143 |
| 6,078,594 A | * | 6/2000 | Anderson et al. ........... | 370/498 |
| 6,255,906 B1 | * | 7/2001 | Eidson et al. ................ | 330/124 |
| 6,314,330 B1 | * | 11/2001 | Matthews ..................... | 700/94 |
| 6,373,954 B1 | * | 4/2002 | Malcolm, Jr. et al. ........ | 381/119 |

* cited by examiner

*Primary Examiner*—Vivian Chin
*Assistant Examiner*—Lun-See Lao
(74) *Attorney, Agent, or Firm*—Arent Fox LLP

(57) ABSTRACT

A sound processor is formed on a single semiconductor device and has a function as a bus master for a common bus to positively and effectively access a resource on a common bus. Outputted is data over N sets (N being a natural number greater than 2) of sound channels through time division multiplexing to M sets (M being a natural number) of independent digital/analog converting means for converting sound-channel digital data into an analog sound signal. This reproduces pulse-code-modulated sound waveform data capable of simultaneously reproducing over a plurality of sets of sound channels represented by a product of M and N.

12 Claims, 12 Drawing Sheets

FIG. 7A

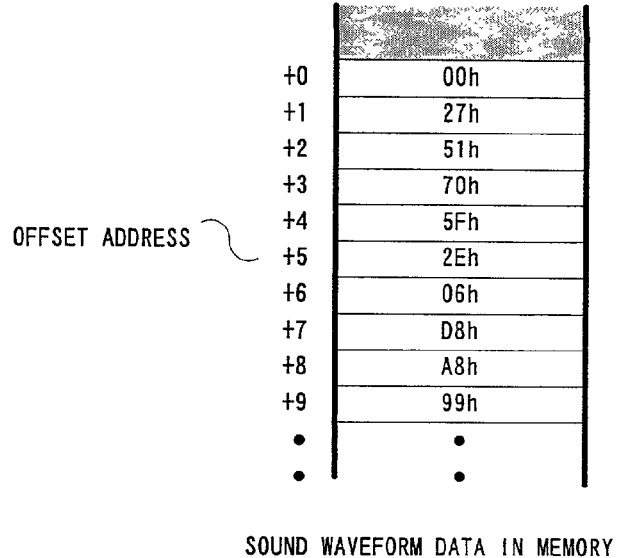

SOUND WAVEFORM DATA IN MEMORY

| | PITCH CONTROL INFORMATION =0.2500 | PITCH CONTROL INFORMATION =0.3536 |
|---|---|---|
| INITIAL VALUE | 0.0000 | 0.0000 |
| 1ST ACCUMULATED RESULT | 0.2500 | 0.3536 |
| 2ND ACCUMULATED RESULT | 0.5000 | 0.7072 |
| 3RD ACCUMULATED RESULT | 0.7500 | 1.0608 |
| 4TH ACCUMULATED RESULT | 1.0000 | 1.4144 |
| 5TH ACCUMULATED RESULT | 1.2500 | 1.7680 |
| 6TH ACCUMULATED RESULT | 1.5000 | 2.1216 |
| 7TH ACCUMULATED RESULT | 1.7500 | 2.4752 |
| 8TH ACCUMULATED RESULT | 2.0000 | 2.8288 |
| 9TH ACCUMULATED RESULT | 2.2500 | 3.1824 |
| 10TH ACCUMULATED RESULT | 2.5000 | 3.5360 |
| 11ST ACCUMULATED RESULT | 2.7500 | 3.8896 |
| 12ND ACCUMULATED RESULT | 3.0000 | 4.2432 |
| 13RD ACCUMULATED RESULT | 3.2500 | 4.5968 |
| 14TH ACCUMULATED RESULT | 3.5000 | 4.9504 |
| 15TH ACCUMULATED RESULT | 0.0000 | 0.0000 |
| 16TH ACCUMULATED RESULT | 4.0000 | 5.6576 |
| 17TH ACCUMULATED RESULT | 4.2500 | 6.0112 |
| 18TH ACCUMULATED RESULT | 4.5000 | 6.3648 |
| 19TH ACCUMULATED RESULT | 4.7500 | 6.7184 |

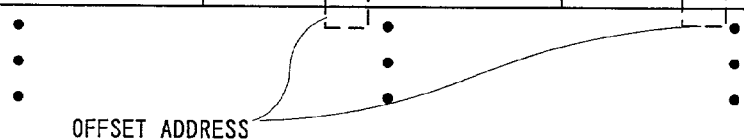

OFFSET ADDRESS

SOUND PROCESSOR

BACKGROUND OF THE INVENTION

1. Field of the Invention

This invention relates to a pulse-code-modulation (hereafter abbreviated as PCM) schemed sound processor suited for use, for example, in TV game machines, personal computers, electronic music instruments, communication network information terminals, portable information devices, communication karaoke sets, intellectual educational toys, teaching aids and so on, and to a sound processing apparatus including such a sound processor.

2. Description of the Prior Art

In the conventional information processing apparatuses, such as the home-use TV game machines and personal computers, and electronic music instruments, there exist many ones using a sound processing apparatus in order to generate music and sound effects according to a progress of software or operation by the user.

Such a sound processing apparatus reproduces music by sequentially setting parameters to control a sound source while interpreting real-time score data having, on a time axis, information including interval, pronunciations, mute and tone effects of sound to be reproduced.

As one of these sound processing apparatuses, the PCM sound modules are broadly used to store, as PCM data, sound waveform data providing a basis for a music instrument or the like and convert the pitch thereof for reproduction according to a musical interval instructed.

For example, the PCM sound module used in the TV game machines such as Super Famicom (trademark) and PlayStation (trademark) are connected as a bus slave to a common bus having, as a bus master, a central processor unit (hereafter abbreviated as CPU) as a host. Note that in the present specification the resources provided on a side of receiving an addresses of the input/output control unit, etc. are termed as bus slaves whereas the resources on a side of issuing an address of a CPU, etc. are as bus masters. These PCM sound modules store sound processing programs in their own local ROMs (Read Only Memories) and score data, sound waveform data, echoing work area in the local RAMs (Random Access Memories).

Meanwhile, the PCM sound modules for personal computers, such as Sound Blaster 32/64 (trademark), are connected as bus slaves to a system bus (PCI bus, ISA bus, etc.) of a personal computer and store score data and data, such as sound waveform tables, in their own local ROMs or local RAMs.

In the PCM sound modules, there is a necessity for the bus master on the common bus, such as a host CPU, to previously transfer various kinds of data to the local RAM prior to reproducing sound.

The scheme, used in the PCM sound modules, requires a large capacity of a local memory, such as a local ROM or local RAM, to store various kinds of data. Besides this, there is a problem that the number of music instruments to be simultaneously reproduced, the length of PCM data to be stream-reproduced, etc. are restricted by the local memory capacity.

In the particular system as the above, the data within the local RAM can be rewritten during reproduction. This however requires the bus master, such as a host CPU or DMA controller, on the common bus to administer transfer of data, thus reducing the process performance for the entire system.

Furthermore, the conventional PCM sound modules use a digital multiplier circuit to multiply the sound data for providing envelope or echo effects. Thus, a large circuit scale is needed in implementing multiplication at high speed.

Also, the conventional PCM sound source apparatuses performs digital addition in order to conduct simultaneous reproduction for a plurality of channels. The simultaneous reproduction for a multiplicity of channels requires accurate digital adders and digital/analog converters, thus forming one factor of increasing the scale of a circuit.

SUMMARY OF THE INVENTION

Therefore, it is a primary object of the present invention to provide a sound processor and sound processing apparatus which is free from functional restriction due to the capacity of a local memory with less processing loading on the host-side units, such as a CPU, but capable of achieving simultaneous reproductions for a multiplicity of channels at low cost.

A first invention has a gist on a sound processor formed on a single semiconductor device to reproduce pulse-code-modulated sound waveform data, comprising: sequence control means; bus interface means for a common bus including an address bus and a data bus; bus master means for issuing an address to the common bus through the bus interface means under control of the sequence control means, and reading and writing data for a resource connected to the common bus; data holding means for holding part of data read out by the bus master means; M sets (M being a natural number) of independent digital/analog converting means for converting digital data over a sound channel into an analog sound signal; data output control means for controlling an output of data to the digital/analog converting means; and time division multiplexing means for time-division-multiplexing and outputting data of over N sets (N being a natural number greater than 2) of sound channels to each of digital/analog converting means required for reproduction; whereby data is to be simultaneously reproduced over a plurality of sets of sound channels represented by a product of M and N.

With the above configuration, the sound processor can positively access the resource connected to the common bus. That is, because direct access is possible to a broad address space, data can be fetched without relying upon other bus masters, such as the CPU, on the common bus. Also, sound waveform data and various parameter data are not limited in size by the capacity of a local memory. Furthermore, the present sound processor does not require a large capacity of a local memory and hence can be supplied at low cost.

Also, simultaneous data reproduction for a plurality of sound channels represented by a product of M and N is realized on a small circuit scale by the provision of M sets of independent digital/analog converting means and the digital/analog conversion of data over an N sets of sound channels through time division multiplexing. This utilizes that time division multiplex if fully short in period provides hearing as if multiplexed sounds were audibly mixed.

A second invention has a gist on a sound processor that the bus master means further has a function of determining whether data required in reproduction is stored in the data holding means or not, and acquiring the data from a resource connected to the common bus and storing the data in the data holding means where the data required in reproduction is not stored in the data holding means.

Usually, the time required for acquiring data from the data holding means, such as a local memory, is shorter as compared to a time required for acquiring data from a resource connected to the common bus. Accordingly, it is to be expected for the sound processor to improve in capability due to the above function possessed by the bus master means.

Furthermore, the reduction of useless accesses to the resource connected to the common bus allows other bus masters, such as the CPU, on the common bus to increase availability to the common bus. It is therefore to be expected that the capability for the system overall including the sound processor is increased.

A third invention has a gist on the sound processor that the digital/analog converting means is structured by a plurality of digital/analog converters and the digital/analog converters are in cascade connection.

Cascade connection, referred to as herein, is connection of an output of a voltage output type digital/analog converter (hereinafter abbreviated as DAC) as a reference voltage of other DACs. This makes an output voltage of the latter proportional to input data of the former and latter, thus structuring an analog multiplier circuit.

The conventional PCM sound modules realize volume control, envelope function, etc. by multiplying parameters thereof by sound waveform data through use of a digital multiplier. However, a high-speed digital multiplier requires a large circuit scale. Also, because the DAC performs conversion into analog sound signals collectively after processing all the operations in the digital operator, there is a need for a DAC having high resolution.

The invention uses cascade-connected DACs instead of a digital multiplier and DAC having high resolution as stated above, and achieves a similar function on a small circuit scale. This has been deduced as a result of a consideration that the multiplication to be made herein is limited to sound processing and does not require an accuracy exceeding beyond audible discriminability.

Here, the volume of the entire sound signals to be outputted and the volume on each sound channel are referred respectively to as a main volume and a channel volume. The function of amplitude-modulating a sound waveform and generating various sound tone effects is referred to as envelope. In the processor for control of them, an optimal configuration example has been searched for and deduced for both cases of monaural sound reproduction and stereo sound reproduction.

An optimal configuration example for monaural sound reproduction comprises one main volume control digital/analog converter, wherein each of the M sets of digital/analog converting means is structured by one channel volume control digital/analog converter, one envelope control digital/analog converter, one sound waveform reproducing digital/analog converter and one waveform neutral point outputting digital/analog converter, the channel volume control digital/analog converters in the number of M being cascade-connected in parallel in a next stage to the main volume control digital/analog converter, in a next stage of which one envelope control digital/analog converter being cascade-connected, in a next stages of which one sound waveform reproducing digital/analog converter and one waveform neutral point outputting digital/analog converter being cascade-connected in parallel, further comprising first mixing means for mixing outputs of the sound waveform reproducing digital/analog converters in the number of M, and second mixing means for mixing outputs of the waveform neutral point outputting digital/analog converters in the number of M, the first and second mixing means having outputs respectively connected to two inputs of a differential amplifier provided at an inside or outside of the semiconductor device. Incidentally, in the case of M being 1, i.e. the digital/analog converting means being only one set, there is no need of mixing means. It is satisfactory to couple outputs of the sound waveform reproducing DAC and the waveform neutral point outputting DAC to a differential amplifier.

An optimal configuration example for stereo sound reproduction comprises one main volume control digital/analog converter, wherein each of the M sets of digital/analog converting means is structured by one channel volume control digital/analog converter, one first envelope control digital/analog converter, one second envelope control digital/analog converter, one first sound waveform reproducing digital/analog converter, one second sound waveform reproducing digital/analog converter, one first waveform neutral point outputting digital/analog converter and one second waveform neutral point outputting digital/analog converter, the channel volume control digital/analog converters in the number of M being cascade-connected in parallel in a next stage to the main volume control digital/analog converter, in a next stage of which the first envelope control digital/analog converter and the second envelope control digital/analog converter being cascade-connected in parallel, in a next stage to each of the first envelope control digital/analog converters the first sound waveform reproducing digital/analog converter and the first waveform neutral point outputting digital/analog converter each one in number being cascade-connected in parallel, in a next stage to each of the second envelope control digital/analog converters the second sound waveform reproducing digital/analog converter and the second waveform neutral point outputting digital/analog converter each one in number being cascade-connected in parallel, further comprising first mixing means for mixing outputs of the first sound waveform reproducing digital/analog converters in the number of M, and second mixing means for mixing outputs of the first waveform neutral point outputting digital/analog converters in the number of M, third mixing means for mixing outputs of the second sound waveform reproducing digital/analog converters in the number of M, and fourth mixing means for mixing outputs of the second waveform neutral point outputting digital/analog converters in the number of M, the first and second mixing means having outputs respectively connected to two inputs of a differential amplifier provided at an inside or outside of the semiconductor device, the third and fourth mixing means having outputs respectively connected to two inputs of a differential amplifier provided at an inside or outside of the semiconductor device.

Note that the above configuration is to be utilized not only for stereo sound reproduction but also for other applications. Incidentally, this configuration also does not especially require mixing means in case that M equals to 1, and it is satisfactory to couple outputs of the sound waveform reproducing DAC and the waveform neutral point outputting DAC to a differential amplifier.

Where configuring an analog multiplier circuit using cascade connection, the mere connection of DACs will make an output waveform amplitude-modulated in a positive direction with respect to a certain voltage value as a lower end. Accordingly, in the two configuration examples, the waveform neutral point outputting DAC having a quite same configuration and characteristic as the sound waveform reproducing DAC but always inputted with a waveform-amplitude neutral point data is connected in parallel with the sound waveform reproducing DAC to have respective output given as two inputs of a differential amplifier. This can provide an output waveform amplitude-modulated in positive and negative directions with respect to a waveform amplitude center as an origin.

A fourth invention has a gist on the sound processor that the data output control means further has a function to control a constant period of a mute state between adjacent sound channels time-division-multiplexed.

This aims at preventing against interference between time-division-multiplexed sound channels.

Also, the mute state desirably has a period to be set programmable. This aims at selecting optimal length of the period depending on DAC characteristics, etc.

A fifth invention has a gist on the sound processor that the data output means further has a function of outputting data in later timing, with respect to timing of outputting data to a certain digital/analog converter, to a digital/analog converter connected in a next stage thereto, and controlling timing of outputs to eliminate interference between time slots due to signal delay between the cascade-connected digital/analog converters when outputting data to the cascade-connected digital/analog converter.

If the data is simultaneously outputted to the stages of the cascade-connected DACs, interference occurs between the time-division-multiplexed sound channels thereby causing inaccurate reproduction, noise, etc. This invention is to eliminate such interference.

Also, the output timing is desirably to be set programmable by a control register or the like. This is because of selecting optimal output timing depending on DAC characteristics, etc.

A sixth invention has a gist on the sound processor that sound waveform data is configured by two arrays having end codes provided at respective terminal ends of the arrays, and the bus master means further having a function to start reading at a head of the first array, uninterruptedly starting reading at a head of the second array immediately after reading the end code of the first array, and uninterruptedly starting reading at the head of the second array after reading out the end code of the second array.

In a PCM-schemed sound processor and sound processing apparatus, generally used as one waveform data compressing technique a technique of decomposing sampled sound of a music instrument into two components of initial impact sound and vibration sound wherein the portion of vibration sound is reproduced by repeating nearly 1 or 2 cycles of the vibration sound while performing amplitude modulation. Here, the initial impact sound portion is referred to as an attack portion and the vibration sound portion as a loop portion. In many music instrument waveforms, the attack portion exhibits a waveform similar to noise containing various frequency components, such as a percussion instrument waveform while the loop portion shows a waveform having analogous-shaped waveforms repeated with a certain period in an attenuating fashion.

The present invention has been made in order to extremely easily achieve the reproduction of a sound waveform comprising an attack portion and a loop portion as stated above without requiring control of other functional blocks, such as a CPU.

A seventh invention has a gist on the sound processor comprising accumulating means and means for storing pitch control information, wherein the pitch control information is read out at a constant time interval and accumulated by the accumulating means, and one part or the whole of an accumulation result being utilized as address information for access to a common bus of the bus master means.

Usually, in pitch conversion for the purpose of varying a musical interval of a sound waveform, broadly used is a method to determine waveform data after pitch conversion by complementing from the original data without changing the data output timing to DAC. With this method, pitch conversion is feasible with extreme accuracy relying upon algorithm for complementary operation. However, the amount of operation is much hence requiring a large circuit scale.

In the present invention, a reading-out period is varied for the data stored in a resource on the common bus or the data holding means. In synchronism with this, data is outputted to the digital/analog converting means, thus extremely easily realizing pitch conversion. If the DAC within the digital/analog converting means has a sufficient conversion speed, pitch conversion is possible without deterioration of sound quality.

An eighth invention has a gist on the sound processor that the bus interface means is provided independent for a plurality of common buses.

In the case that the sound processor is connected to a plurality of common buses, the bus interface means is also required for each of the common buses. Here, it is desired that the bus interface means is independently provided for each common bus and configured to access the common bus according to a requirement by the bus master means where there is an access requirement. Due to this, when the sound processor is accessing one of the common buses, another bus master can access another common bus.

A ninth invention has a gist on the sound processor further comprising interrupt request control means to be controlled by the sequence control means and generate an interrupt request signal, wherein the bus master means comprises waveform reading control means to control reading of sound waveform data, envelope/preset control means to control reading out of parameters for controlling envelope data and sound reproduction, and access arbitrating means to arbitrate between an access of from the envelope/preset control means to the common bus and an access of from the waveform reading control means to the common bus, the bus interface means comprising first bus interface means to a first common bus, and second bus interface to a second common bus.

A tenth invention has a gist on a sound processor apparatus, comprising: being configured on one single semiconductor device, first and second buses having independent data transfer capabilities, a central processing unit and the sound processor as bus masters for the first and second buses, a memory connected to the first bus, a first bus arbitrating means to administer arbitration over the first bus, and a second bus arbitrating means to administer arbitration over the second bus.

With the configuration of the sound processor according to the invention, positive access is possible to a resource connected to the common bus. That is, because direct access is possible to a broad address space, data can be fetched without relying on other bus masters, such as a CPU, on the common bus. Also, the sound waveform data and various parameters data are not limited in size by a local memory capacity. Furthermore, the sound processor does not require a large capacity of a local memory and hence can be supplied at low cost.

Also, a second effect of the invention lies in that simultaneous reproduction of data over a plurality of sets of sound channels represented by a product of M and N can be realized on a small circuit scale by independently possessing M sets of digital/analog converting means and digital/analog-converting the data over N sets of sound channels through time division multiplex.

A third effect of the invention lies in a function of determining whether or not the data required in reproduction is stored in the data holding means and, where the data required for reproduction is not stored in the data holding means, the data is acquired from the resource connected to the common bus and stored in the data holding means. Usually, the time required in acquiring data from the data holding means, such as a local memory, is short as compared to a time requiring for getting data from the resource connected to the common bus. It can be expected that the capability of the sound processor is improved by the provision of the above function. Furthermore, because useless accesses are reduced to the resource connected to the common bus, the other bus master, such as the CPU, on the common bus has increased availability to the common bus. Thus, it is to be expected to improve the capability of the system overall including the sound processor.

A fourth effect of the invention lies in that a similar function can be exhibited on a small circuit scale using cascade-connected DACs without employing high-speed digital multipliers and DACs having high resolution requiring a large circuit scale, from a consideration on a point that multiplication to be carried out in the sound processor of the invention is limited to sound processing and the accuracy exceeding beyond audible discrimination is not necessary.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are figures showing an example of pitch conversion in sound waveform reproduction;

DETAILED DESCRIPTION OF THE PREFERRED EMBODIMENTS

Figure 1:
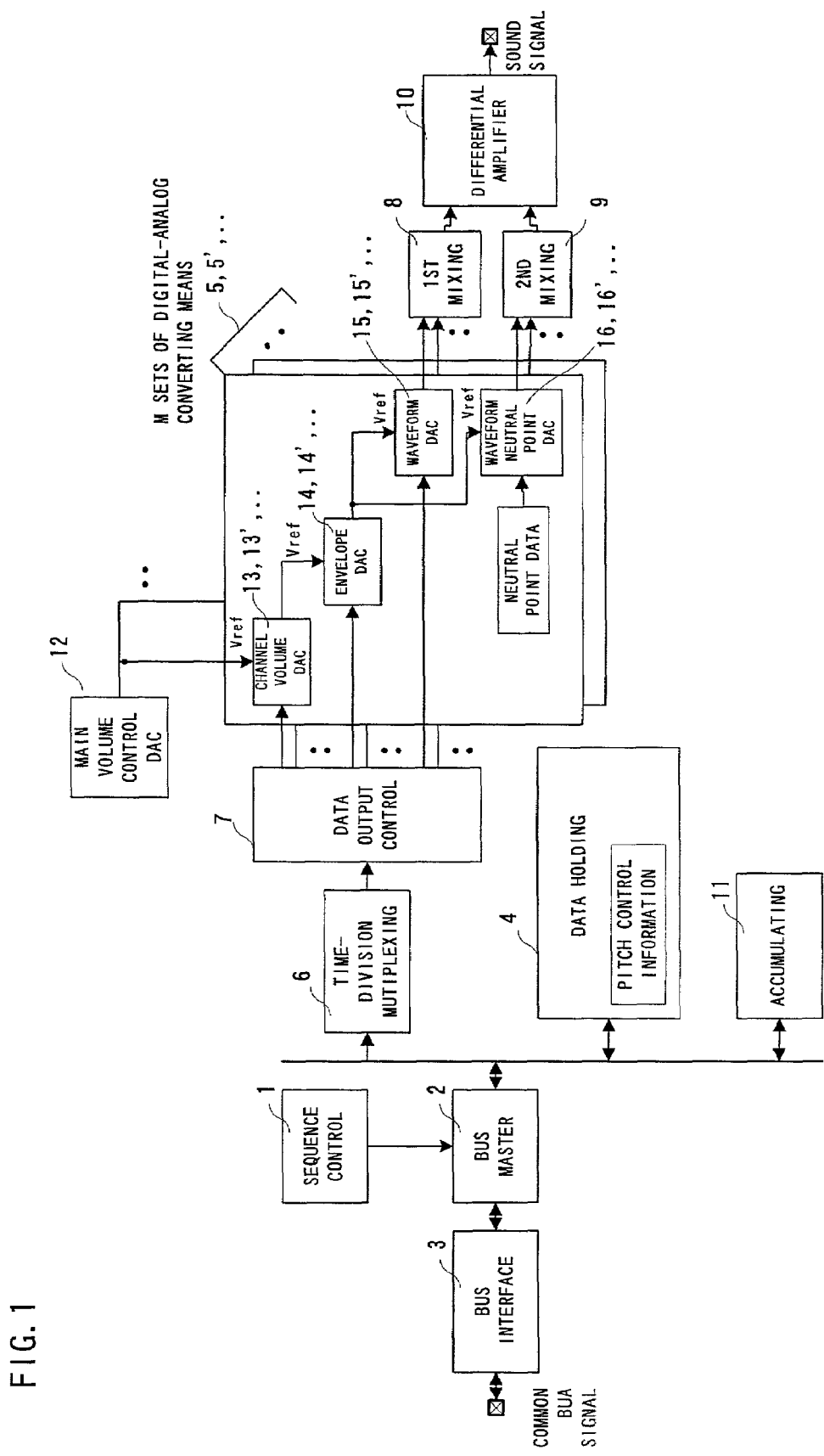
FIG. 1 is a figure showing a basic configuration of a sound processor according to the present invention.

FIG. 1 is a schematic diagram showing a basic configuration of a sound processor according to the present invention. The sound processor comprises sequence control means 1, bus master means 2, bus interface means 3, data holding means 4, M sets of digital/analog converting means 5, 5', . . ., time division multiplexing means 6, data output control means 7, first mixing means 8, second mixing means 9, differential amplifier 10, accumulating means 11 and main volume control DAC 12.

These of the means will be explained hereunder.

The sequence control means 1 produces a sequence of processing and controls the operation of the bus master means 2 based on a sequence produced. This may be a sequencer configured by a counter or timer, or use a processor such as a CPU.

The bus interface means 3 is to input and output signals to and from a common bus located outside the present sound processor. Although this usually is to interface with a bus configured by address bus, data bus and control signals such as read/write signals, etc., the bus is not limited to this configuration. Also, where the common bus is to be accessed by a plurality of bus masters, bus arbitration is carried out by bus arbitration signals or the like. The bus interface means may also administer the processing for bus arbitration alike this. Also, interfaces may be provided to a plurality of common buses as described before. In this case, suitably used is a scheme that the bus interface means decodes an address issued by the bus master means and determines to which common bus the access is made thereby having an interface to a common bus to be accessed.

The bus master means 2 accesses the common bus through the bus interface means 3 under the control of the sequence control means 1. The bus master means acquires channel volume data, envelope data, sound waveform data, other parameters for controlling sound reproduction, etc. from a resource, such as a memory, connected to the common bus. Also, a function may be further provided to write a state of current sound processing or the like to the resource, such as a memory. The bus master means may be configured by a wired logic or realized by a processor such as a CPU.

The data holding means 4 is to hold data acquired by the bus master means 2. Also, a function may be further provided to temporarily save the data to be written to the resource, such as a memory, on the common bus by the bus master means 2. The data holding means may be configured by a memory such as a RAM or a register file configured by a flip-flop or latch.

The bus master means 2 previously determines, prior to accessing the resource such as a memory on the common bus, whether data needed is stored in the data holding means 4 or not. If stored, no access is made. If not stored, access is made to obtain data. Furthermore, it is desirable to further have a function of renewing data in the data holding means. This makes it possible to reduce accesses to the common bus to a possible low extent, providing an effect of increasing a term the common bus is to be used by other bus masters in addition to improvement of processing performance of the sound processor.

The M sets (M is a natural number) of digital/analog converting means 5, 5', are to convert at least sound waveform data into an analog sound signal. Each of them may be a single digital/analog converter or structured by a plurality of digital/analog converters as shown, for example, in FIG. 1.

In the meanwhile, it is extremely effective to perform amplitude modulation on a sound waveform by use of so-called envelope, in order to implement sound reproduction in various ways or with fidelity to fundamental tone by using decreased sound waveform data. As in the sound waveform shown in FIG. 8, sound signals of various music instruments can be reproduced with reduced amount of sound waveform data by repeatedly reproducing basic one cycle of a sound waveform and multiplying this by envelop data varying in time.

Also, when simultaneously reproducing sound waveform data over a plurality of channels as in reproducing music using a plurality of music instruments, it is requisite to control the volume on each channel.

The control of envelope or channel volume in this manner requires multiplication of their parameters and the former sound waveform data. In the conventional PCM sound source apparatus, such multiplication is made by a digital multiplier. However, the present invention has an analog multiplier circuit formed by cascade-connected DACs to implement multiplication, as shown in FIG. 1.

The digital/analog converting means shown in FIG. 1 is configured for monaural reproduction. The configuration example of a digital/analog converting means for stereo reproduction is shown in FIG. 2.

Figure 2:
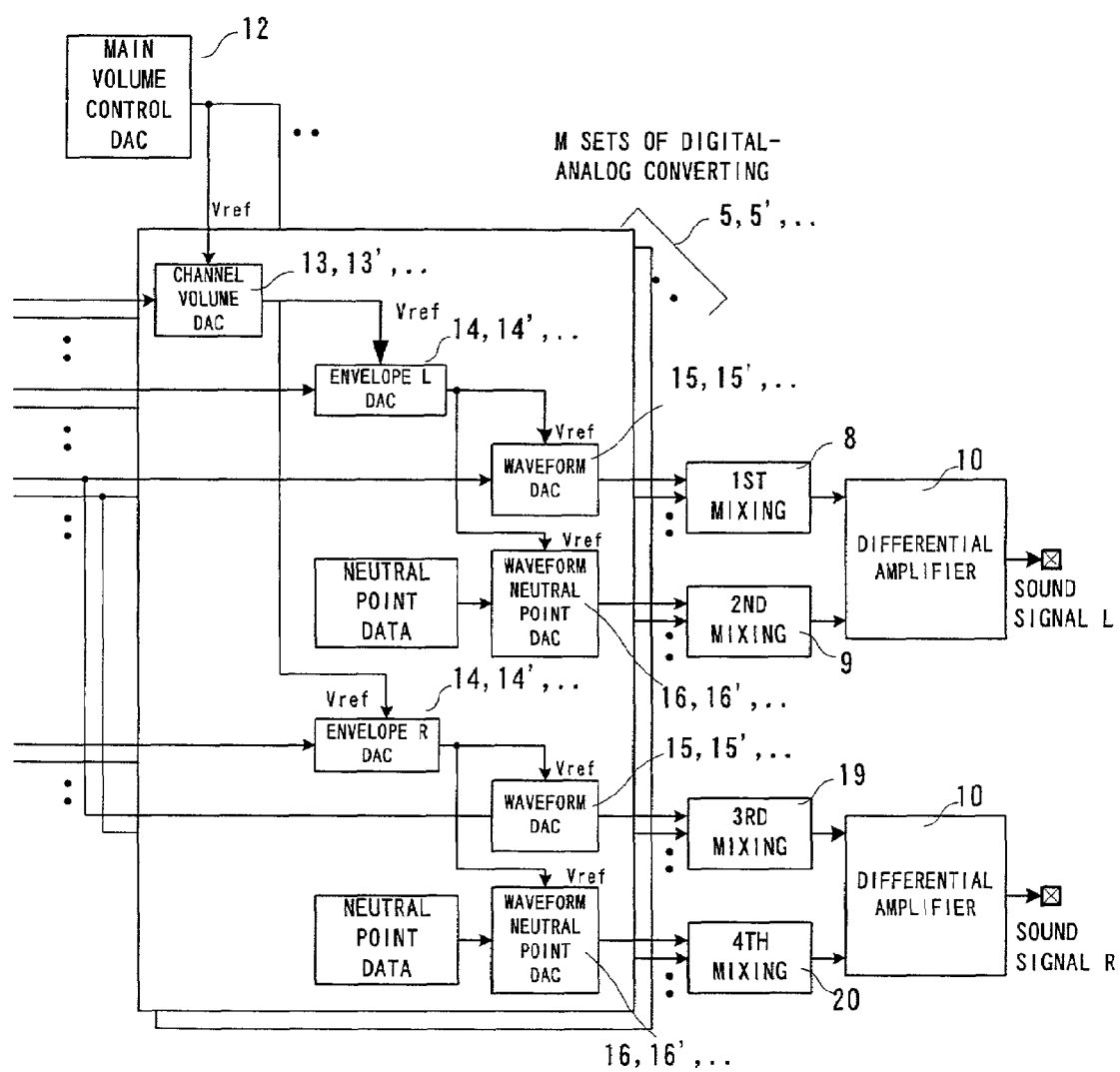
FIG. 2 is a figure showing a configuration example of a digital/analog converting means for stereo reproduction.

The main volume control DAC 12 shown in FIG. 1 and FIG. 2 is to control volume for the sound signal entirety. This DAC has an output to be inputted as a reference voltage to the M sets of digital/analog converting means 5, 5', . . . , thus constituting an analog multiplier circuit as stated before. The data output to the main volume control DAC 12 may be made from the common-bus bus master, such as an external CPU, through a control register, or by the data output control means 6 similarly to the other DACs.

The channel volume control DACs 13, 13', . . . shown in FIG. 1 and FIG. 2 are to control volume on each of the sound channels.

The envelope control DACs 14, 14', . . . shown in FIG. 1 are to control an envelope on each of the sound channels. The envelope L control DAC 14, 14', . . . and the envelope R control DAC 14, 14', . . . shown in FIG. 2 are to control respective envelopes of a left channel and a right channel of each sound channel. By changing the values set on them, an effect of pan-pot or the like can be easily achieved.

The sound waveform reproducing DACs 15, 15', . . . shown in FIG. 1 and FIG. 2 are to convert PCM sound waveform data into an analog sound signal. Although FIG. 2 shows an example of inputting the same sound waveform data to the left and right channels, input may be by different data.

The waveform neutral point outputting DACs 16, 16', . . . are quite same in configuration and characteristic to the sound waveform reproducing DACs 15, 15', . . . . However, they are to be always inputted by data to provide a waveform-amplitude neutral point.

The sound waveform reproducing DAC 15, 15', has an output having a waveform which is amplitude-modulated only in a positive direction with respect to a certain voltage value as a lower end by the cascade connection with the main volume control DAC, the channel volume control DAC and the envelope control DAC. The purpose of the waveform neutral point outputting DAC is to produce an offset voltage to make an output waveform of the differential amplifier amplitude-modulate in both positive and negative directions with respect to a waveform-amplitude neutral point as an origin.

Figure 3:
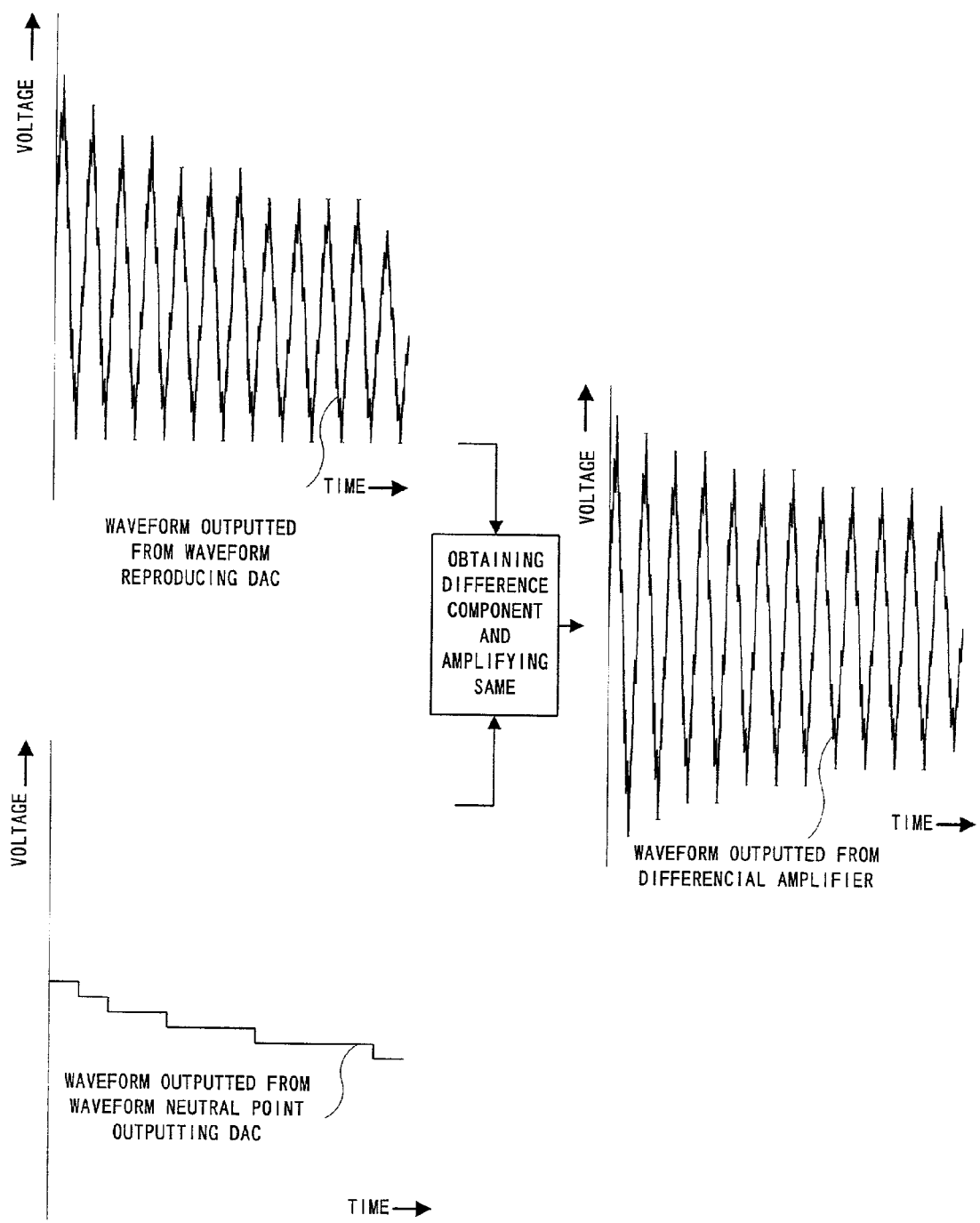
FIG. 3 is a figure showing examples of sound waveforms outputted from a differential amplifier.

FIG. 3 shows an example of a sound waveform outputted from the differential amplifier. Outputted to the rear-staged differential amplifier are the waveform outputted from the sound waveform reproducing DAC and the waveform outputted from the waveform neutral point outputting DAC connected in parallel with the sound waveform reproducing DAC. Thus, these waveforms are amplified in difference of waveform voltage values by the differential amplifier.

The time division multiplexing means 6, when outputting data to the M sets of digital/analog converting means through the data output control means 7, outputs N sets (N is a natural integer greater than 2) of sound channel data through time division multiplexing. Due to this, the respective ones of digital/analog converting means reproduce, by time division, N sets of sound channel data. The time division, if sufficiently short in period, gives N sets of sound waveforms that are audible in a mixed fashion.

Figure 4:
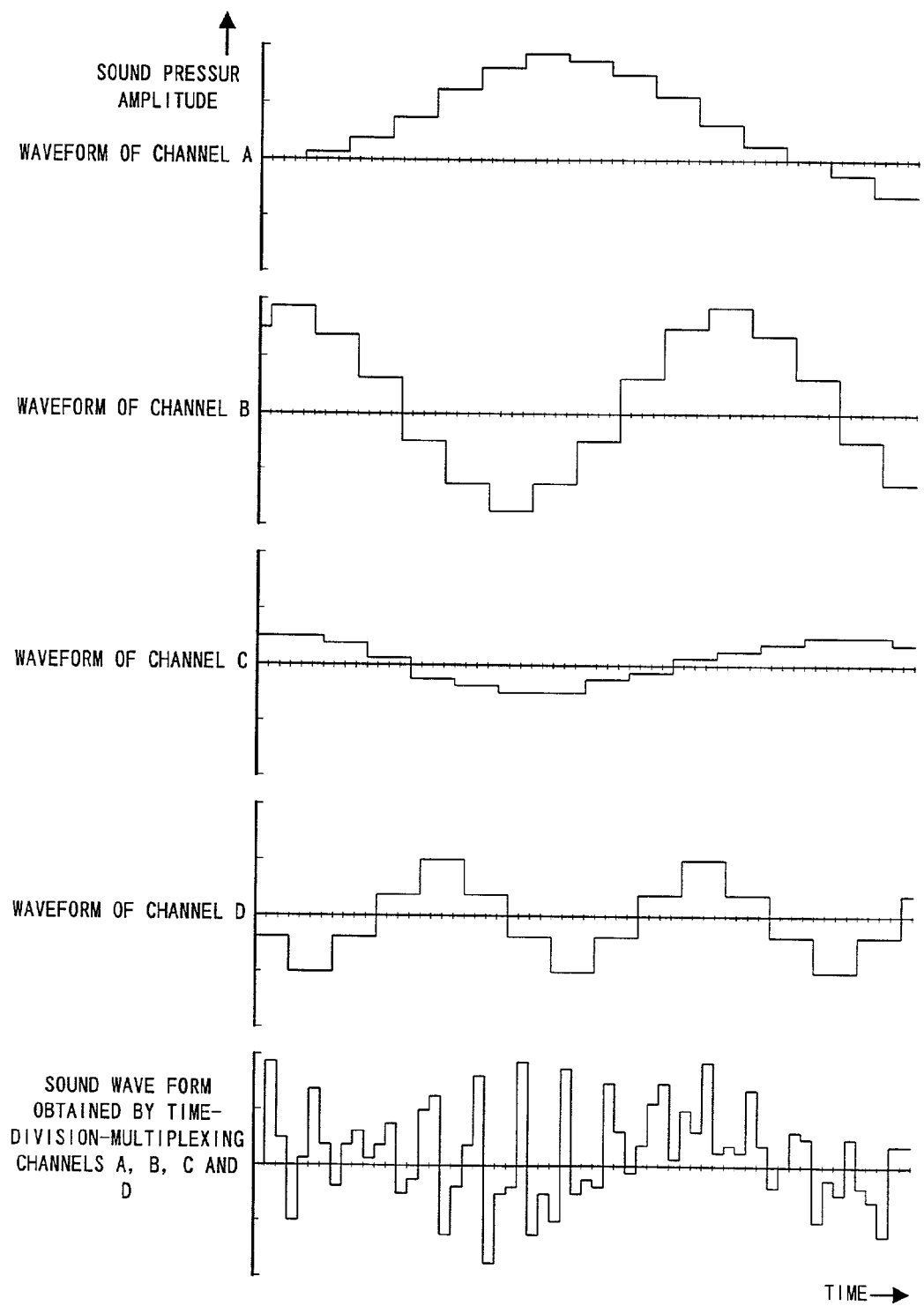
FIG. 4 is a figure showing examples of sound waveforms time-division-multiplexed.

FIG. 4 shows an example of a sound waveform that are time-division-multiplexed. Here are multiplexed four sound waveforms of over a channel A, a channel B, a channel C and a channel D. It should be emphasized herein that, where time-division-multiplexing N sets of sound waveforms, the frequency of time division multiplexing should be N times higher than a sampling frequency of a sampled waveform. In the FIG. 4 example, time division multiplexing is made with a frequency of 4 times a sampling frequency of a sampled waveform.

Figure 5:
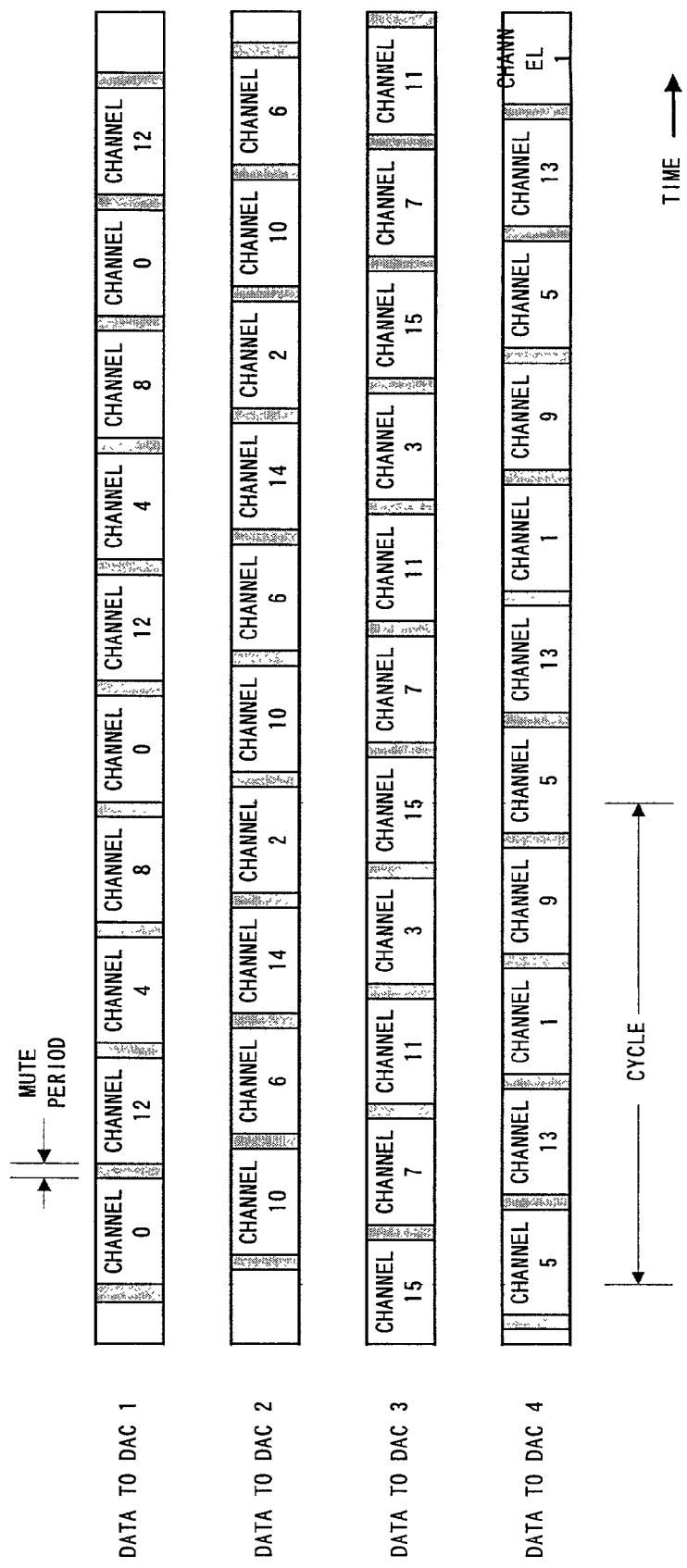
FIG. 5 is a figure showing examples of time-division-multiplexing of data outputted to the digital/analog converting means.

FIG. 5 shows time-division-multiplexing of data to be outputted to the digital/analog converting means. In this figure, four sets of sound channel data are time-division-multiplexed for respective 4 sets of digital/analog converting means, thereby achieving simultaneous reproduction for channels 0 to 15, i.e. totally 16 channels. Where time division multiplexing is made with a plurality of sets of digital/analog converting means, if switching the channels is same in timing on these of the digital/analog converting means, there is a fear of increasing noise level. It is accordingly desired, as in the example shown in FIG. 5, to provide a difference of timing to the digital/analog converting means. Meanwhile, the time division multiplex preferably uses a scheme of repeating a period containing all the sound channels, as shown in FIG. 5.

The data output control means 7 administers to output data to M sets of digital/analog converting means.

The data output control means 7 preferably has a function to provide a certain period of mute term between the sound channels in order to eliminate interference from time-division multiplexed sound channels upon data outputting. The mute term referred herein is to be created by outputting data representative of an amplitude neutral point to the sound waveform reproducing DAC. Also, where provided with a channel volume control DAC and envelope control DAC, such data should be simultaneously outputted to them as to provide a result of multiplication of 0.

Mute period is also provided in the example shown in FIG. 5.

The length of the mute period is desirably set programmable by a control register or the like.

Also, in the case of DAC in cascade connection, there is a fear of interference to occur between the time-division-multiplexed sound channels due to signal delay. In order to eliminate the interference, it is desired for the data output control means 7 to have a further function of providing an output with a certain time of delay, with respect to the timing of outputting data to a certain DAC, in timing to outputting data to a cascade-connected DAC in the next stage.

It is desired that the length of delay is to be programmably set by a control register or the like.

The first mixing means 8 mixes the outputs of from the sound waveform reproducing DACs in the number of M. The second mixing means 9 is required when waveform neutral point DACs are included respectively in the digital/analog converting means in the number of M as shown in FIG. 1, and mixes the outputs of the waveform neutral point DACs in the number of M. Each mixing means may be simple in configuration, for example, using resistors.

In the example shown in FIG. 2, the first mixing means 8 and the second mixing means 9 perform mixing for the left channel while the third mixing means 19 and the fourth mixing means 20 perform mixing for the right channel.

The differential amplifier 11 is provided to amplify a difference of between signals outputted from the first mixing means 8 and the second mixing means 9 and output a sound signal. The differential amplifier may be provided within a semiconductor device on which the present sound processor is configured or at an outside of the semiconductor device.

In the example shown in FIG. 2, a first differential amplifier 21 is used to amplify a difference of between outputs of the first mixing means 8 and the second mixing means 9 and output a left-channel signal L. A second differential amplifier 22 is used to amplify a difference of between outputs of the third mixing means 19 and the fourth mixing means 20 and output a right-channel sound signal R.

The accumulating means 11 is used for pitch conversion of varying a period of reading out sound waveform data or envelope data. Pitch control information is read out at a constant interval and accumulated by the accumulating means. A result of accumulation is processed into an address pointer for the above data. Accordingly, a larger value if set for the pitch control information increases the rate of increment of an address pointer. A smaller value if set decreases the rate of increment.

The pitch control information may be stored in independent data holding means but it, in the example shown in FIG. 1, is stored in the data holding means.

Figure 6:
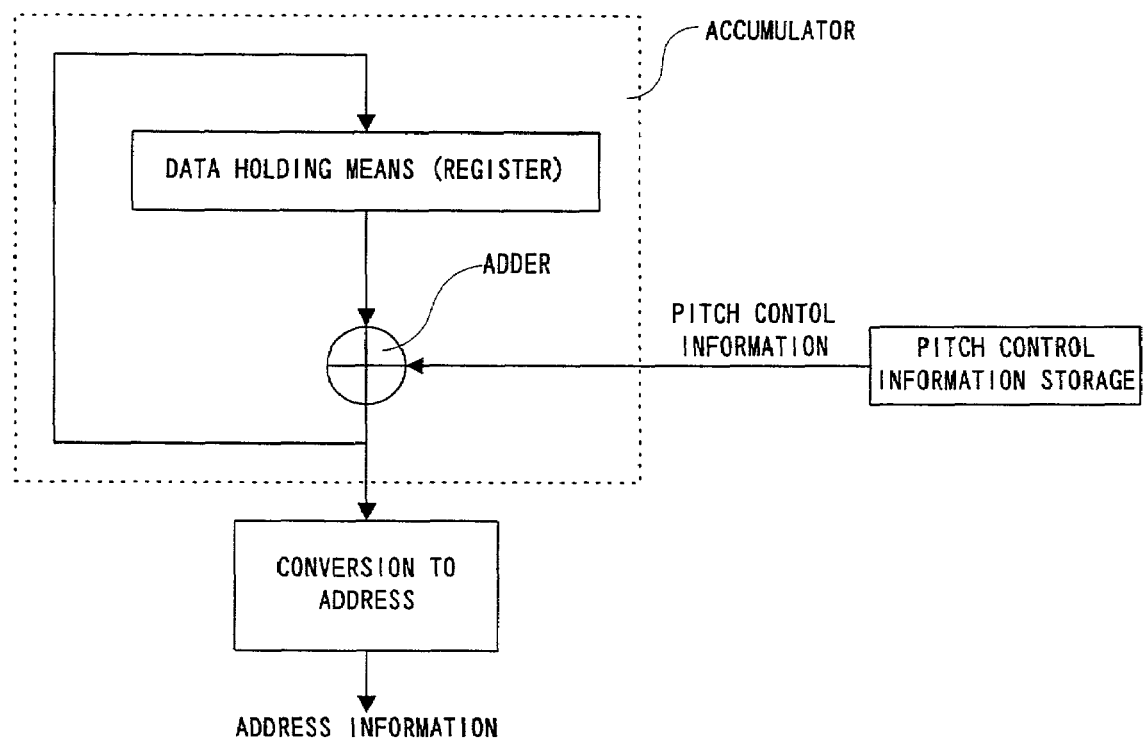
FIG. 6 is a figure showing a model of accumulating means for pitch conversion.

FIG. 6 shows a model of the accumulating means for pitch conversion. The pitch control information stored in the pitch control information storing means is read out at a constant interval and accumulated within an accumulator constituted by data holding means, such as a register and adder. A result of accumulation is converted into address information by the bus master means 2 or the like.

Figure 7B:
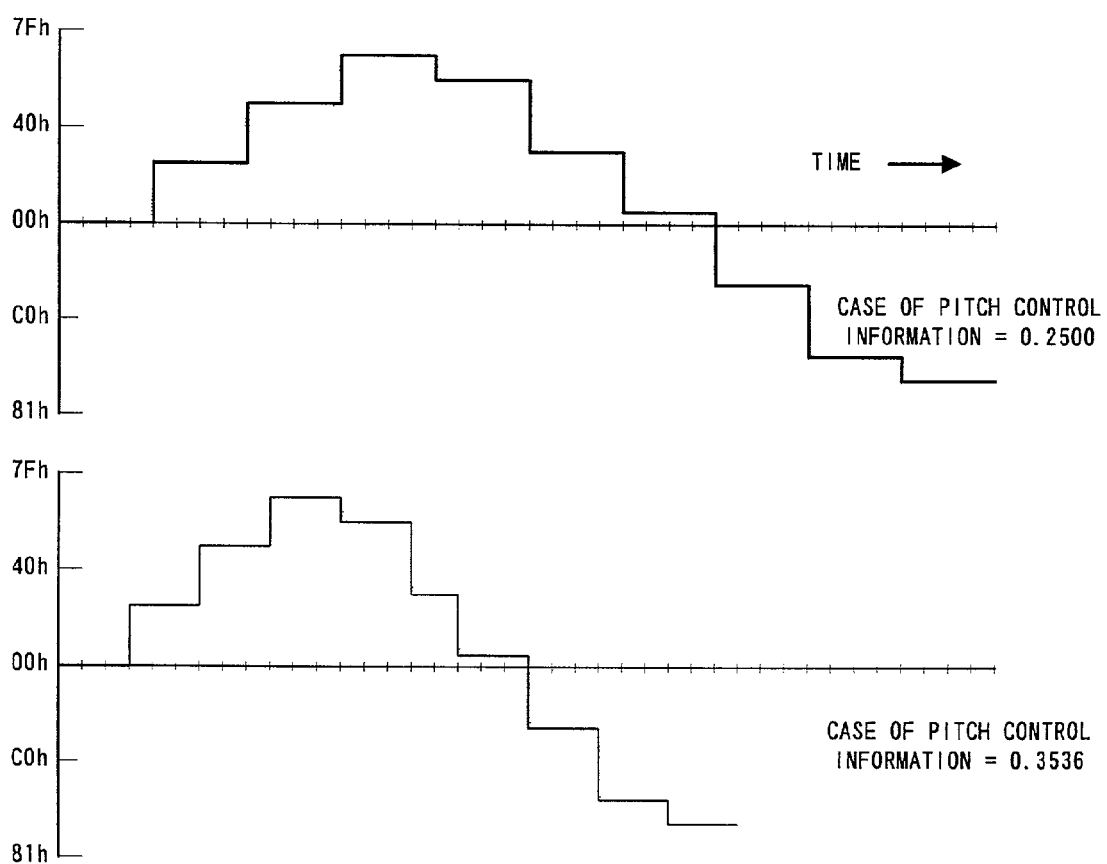

As one example of address conversion, there is included a method of adding the higher N bits as an offset address to a base address indicating a head of an array storing the data. FIGS. 7A and 7B show an example of pitch conversion in sound waveform reproduction based on this scheme.

In the example shown in FIGS. 7A and 7B, two cases are taken where the pitch control information is 0.02500 and 0.3536, and comparison is made between the waveforms produced as a result of them.

In this example, sound waveform data is stored on a byte-by-byte basis within the memory. This is 8-bit PCM data and expressed as a 2's complement. The data in the figure is given in hexadecimal notation. The address referring to this data is incremented by 1 per byte.

The accumulation result has an integer part to be used as an offset address referring to the above data. The resulting two waveforms produced are shown in FIG. 7B. As a result, the frequency of a waveform for pitch control information of 0.3536 is at a frequency multiplied by a square root of that for 0.2500, i.e. a half-octave higher.

The bus master 2 further has a function of starting to read at a head of a first array of the stored sound waveform data, uninterruptedly starting to read at a head of a second array immediately after reading an end code of the first array, and uninterruptedly starting to read at the head of the second array after reading an end code of the second array. This function is well suited for reproducing a music-instrument sound waveform constituted by an attack portion and a loop portion.

Figure 8:
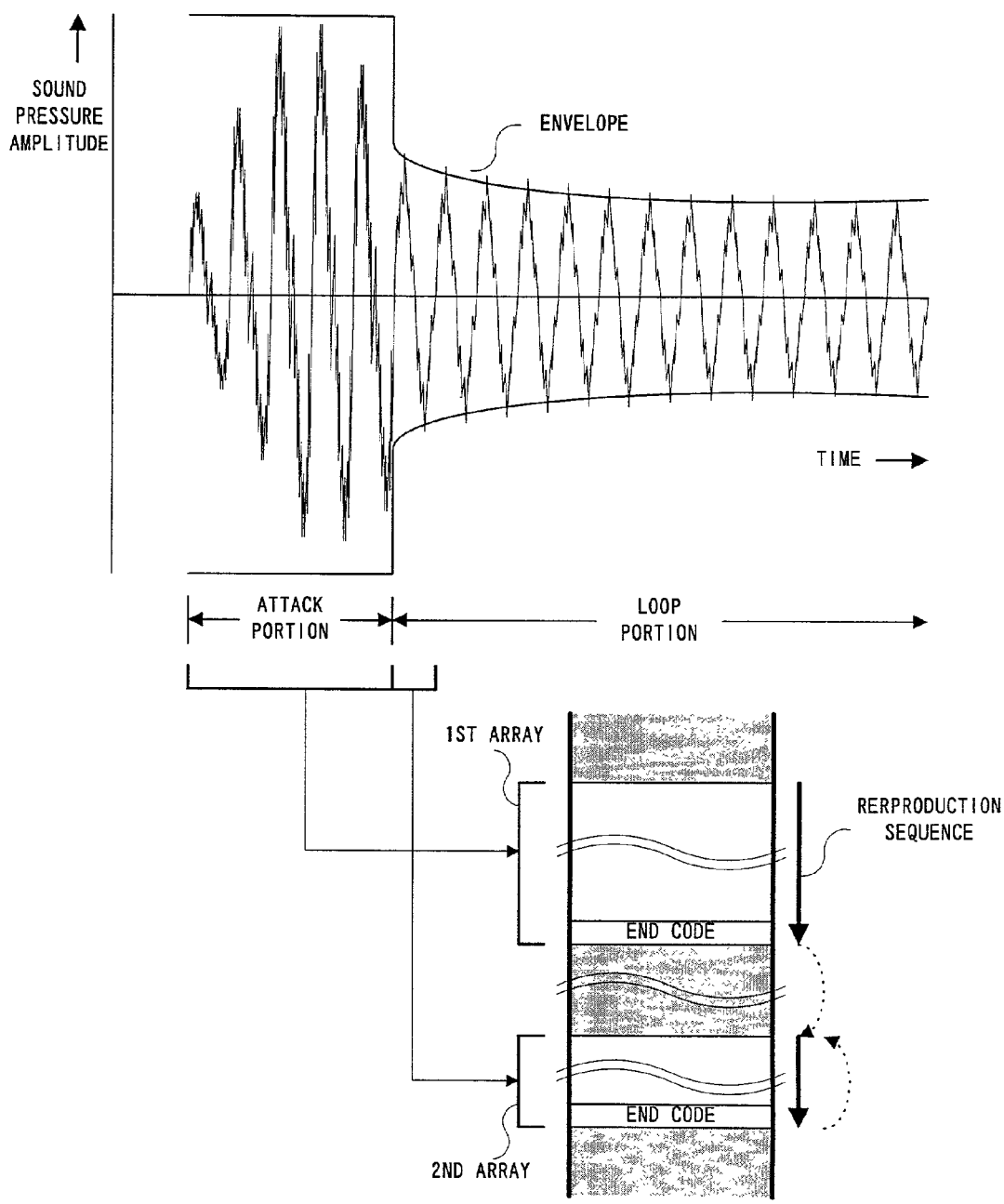
FIG. 8 is a figure showing an example of a sound waveform configured by an attach portion and a loop portion.

FIG. 8 shows a relationship between an example of a sound waveform formed by an attack portion and a loop portion, with a relationship to the above-stated first and second arrays. The sound-waveform attack portion shown herein is analogous to an impact sound containing a wide range of frequency components. The entire attack portion is stored as PCM data in the first array. The loop portion shown herein is to be reproduced by modulating the amplitude of repeated 1-period waveforms with using an envelope. The waveform data in a 1-period loop portion is stored as PCM data in the second array.

In the sound processor shown in FIG. 1, the head address of the first array and the head address of the second array are suitably stored to a control register or data holding means 4.

Figure 9:
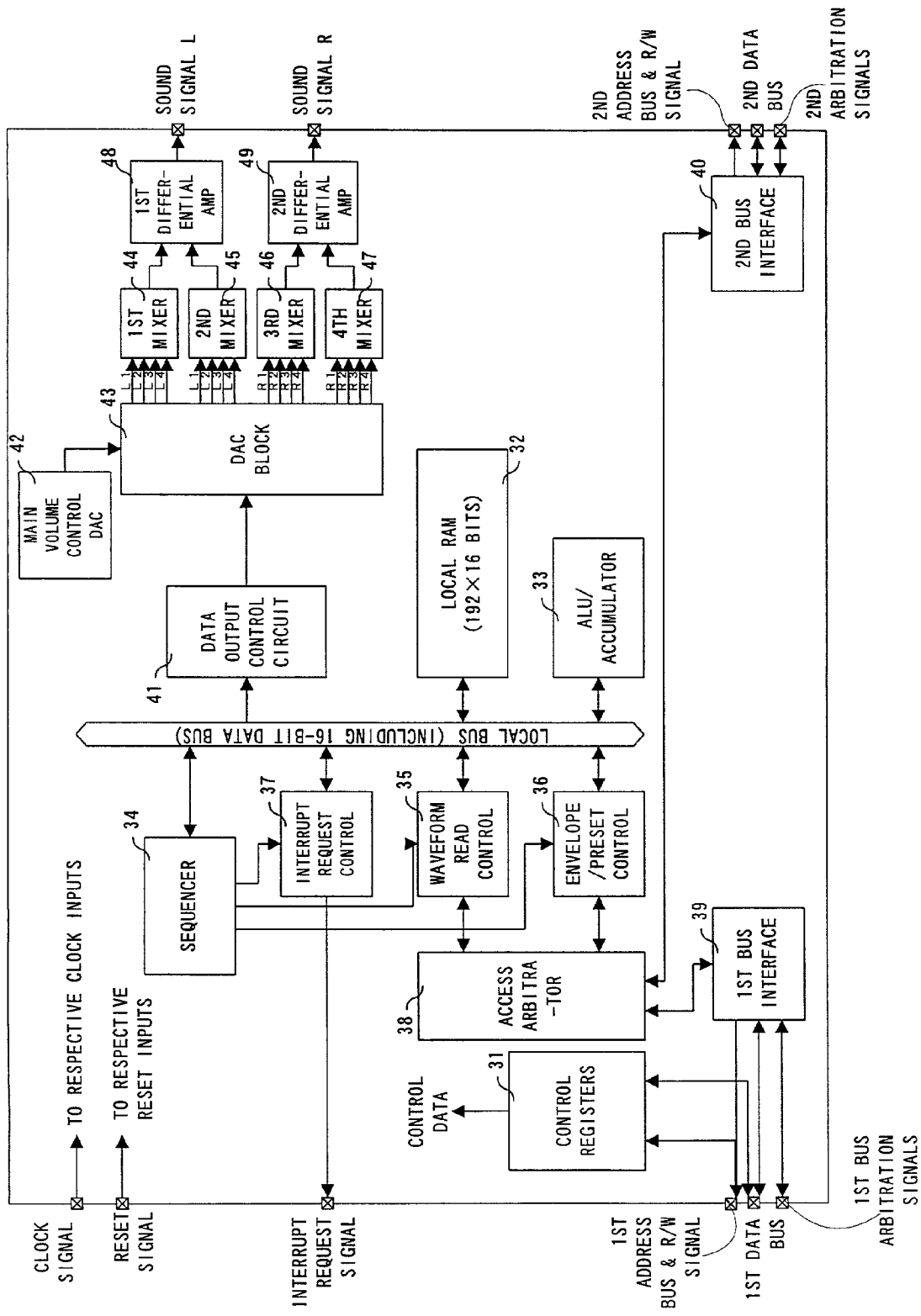
FIG. 9 is a schematic diagram of an essential part of the sound processor of the embodiment.

FIG. 9 shows as an embodiment an outline of an essential part of a sound processor according to the invention. The present sound processor comprises a control registers 31, a local RAM 32, an ALU/accumulator 33, a sequencer 34, a waveform read control circuit 35, an envelope/preset control circuit 36, an interrupt request control circuit 37, an access arbitrator circuit 38, a first bus interface 39, a second bus interface 40, a data output control circuit 41, a main volume control DAC 42, a DAC block 43, a first mixer 44, a second mixer 45, a third mixer 46, a fourth mixer 47, a first differential amplifier 48, a second differential amplifier 49 and a local bus.

This sound processor is connected to two common buses, i.e. a first bus and a second bus, located outside the sound processor. The external bus master, such as the CPU, is allowed to control the sound processor through the first bus. The sound processor can access the resources, such as memories, connected to the first bus and second bus.

The control registers 31 are connected to the first bus and hold control data of various sections written by the first-bus bus master, such as the CPU. Also, the bus master of the CPU or the like can recognize a current state of the sound processor by reading out data out of the control registers 31.

The local RAM 32 has 192×16 bits, i.e. totally 384 bytes, and holds a progress of the data and processing acquired by the waveform-reading control circuit 35 and envelope/preset control circuit 36. The local RAM 32 provides for a function of data holding means 4 shown in FIG. 1.

The ALU/accumulator 33 implements arithmetic logical operation and accumulation. This is used to enable the waveform-reading control circuit 35 and envelope/preset control circuit 36 to perform address operation as well as the interrupt request control circuit 37 to operate an interval of interrupt request signals. The ALU/accumulator 33 provides for a function of accumulating means 11 shown in FIG. 1.

The sequencer 34 controls the waveform-reading control circuit 35, envelope/preset control circuit 36 and interrupt request control circuit 37 based on the time schedule created by an internal counter. During sound reproducing, this reads channel volume data, envelope data L, envelope data R and sound waveform data for each sound channel out of the local RAM 32, and outputs these to the data output control circuit 41 through time division multiplex. The sequencer 34 provides for a function as sequence control means 1 and time division multiplexing means 6 shown in FIG. 1.

The waveform-reading control circuit 35 administers the control of reading sound waveform data for each sound channel out of the memory connected to the first bus or second bus, based on the control data written in the control register 31 and control from the sequencer 34.

Also, the waveform read control circuit 35 provides for a function of reproducing, as stated before, sound waveform data formed by the first array and second array.

The envelope/preset control circuit 36 administers the control of reading envelope data L/R for each sound channel out of the memory connected to the first bus or second bus based on the control data written in the control register 31 and under control of the sequencer 34, and the operation called preset of reading various parameters to control sound reproduction prior to starting sound reproduction out of the memory connected to the first bus into the local RAM 32.

The access arbitrator circuit 38 administers the arbitration of accesses of from the waveform-reading control circuit 35 and envelope/preset control circuit 36 to the first bus and second bus. The waveform-reading control circuit 35, the envelope/preset control circuit 36 and the access arbitrator circuit 38 provide for a function as the bus master means 2 shown in FIG. 1.

The interrupt request control circuit 37 produces an interrupt request signal to an external CPU based on the control data written in the control register 31 and under control of the sequencer 34. The interrupt request signal is produced at a constant time interval so that the external CPU can manage the sound processor based on music score data. The interrupt request control means 37 has four interruption sources each of which generates interrupt requests at an independent time interval by utilization of the ALU/accumulator 33. The interrupt request signal to be outputted is a logical OR of these four interrupt requests.

The first bus interface 39 accesses the memory connected to the first bus based on an arbitrated access request to the first bus by the access arbitrator circuit 38. Also, in a system requiring bus arbitration upon accessing the first bus, this makes an access based upon bus arbitration signals.

The second bus interface 40 accesses the memory connected to the second bus based on an arbitrated access request to the second bus by the access arbitrator circuit 38. Also, in a system requiring bus arbitration upon accessing the second bus, this makes an access based upon bus arbitration signals. The first bus interface 39 and the second bus interface 40 cooperatively provide for a function of the bus interface means 3 shown in FIG. 1.

The data output control circuit 41 temporarily holds, in its internal register, channel volume data, envelope data L/R and sound waveform data to be outputted to the DAC block 42, and outputs them in proper timing to the DAC block 42. The data output control circuit 41 provides a constant time of mute periods in between time slots of each of time-division-multiplexed sound channel data, thereby eliminating interference between the sound channels put in adjacent time slots. Also, by outputting main volume data, channel volume data, envelope data L/R and sound waveform data in the order with a somewhat difference of time, it is possible to eliminate interference of between the sound channels due to signal delay occurring between the cascade-connected DACs. The mute period and the time difference is to be programmably set in length through the control register 31, and hence optimized in length suited for the DAC characteristic, etc.

The main volume control DAC 42 controls the volume of the entire sound signals based on a value written on the control register 31. The output of the DAC is coupled to reference voltage inputs of four sets of channel volume control DACs within the DAC block 43.

The DAC block 42 comprises four sets of analog/digital converting means. Each digital/analog converting means comprises one channel volume control DAC, one envelope L control DAC, one envelope R control DAC, two sound waveform reproducing DACs and two waveform neutral point outputting DACs. These are respectively inputted with channel volume data, envelope data L, envelope data R and sound waveform data by the data output control circuit 31. The waveform neutral point outputting DAC is inputted with a fixed value representative of a waveform-amplitude neutral point. These DACs are connected in the same form as those shown in FIG. 2. Of the two sound waveform reproducing DACs, one is for the left channel and the other for the right channel. This is true for the waveform neutral point outputting DACs. The cascade-connected DACs constitute an analog multiplier circuit thus achieving high-speed multiplication on a small-scale circuit.

The first mixer 44 mixes the outputs of from the four sound waveform reproducing DACs for the left channel.

The second mixer 45 mixes the outputs of from the four waveform neutral point outputting DACs for the left channel.

The third mixer 46 mixes the outputs of from the four sound waveform reproducing DACs for the right channel.

The fourth mixer 47 mixes the outputs of from the four waveform neutral point outputting DACs for the right channel.

The first differential amplifier 48 amplifies a difference of between the outputs from the first mixer 44 and second mixer 45, and outputs a sound signal L for the left channel.

The second differential amplifier 49 amplifies a difference of between the outputs from the third mixer 46 and fourth mixer 47, and outputs a sound signal R for the right channel.

Figure 10:
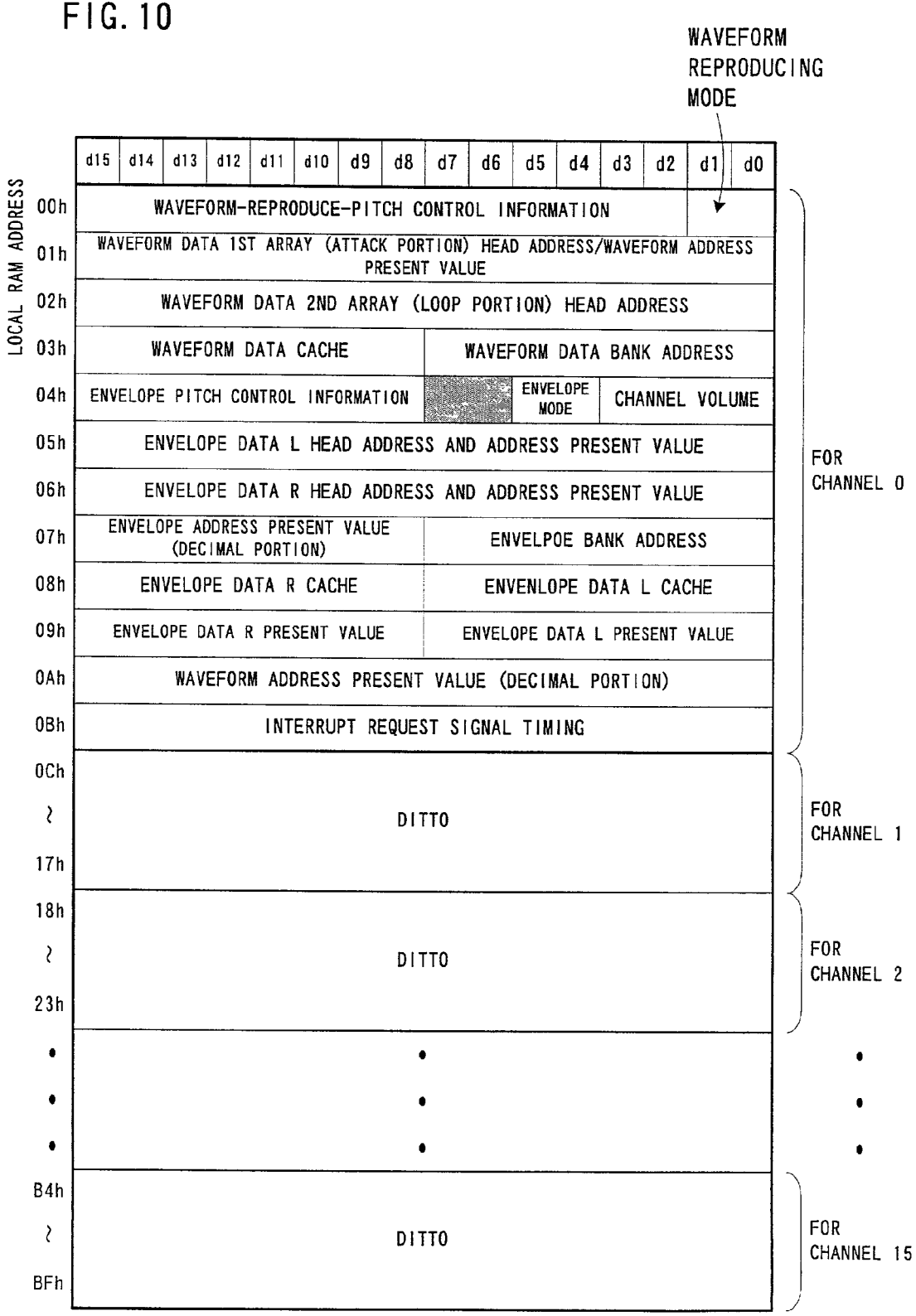
FIG. 10 is a table showing a content of a local RAM in the embodiment.

FIG. 10 shows a content of the local RAM 32.

The local RAM 32 stores 16 channels of data of 24 bytes per sound channel, i.e. totally 384 bytes. 1 word comprises 2 bytes, i.e. 16 bits. The words of from 00h (h representing a hexadecimal number) to 0Bh are assigned to channel 0 and the remaining down to BFh are assigned, in order, to the fifteen channels. The channels have a same content. Hereunder, the data over the channel 0 is exemplified for explanation.

The word 00h stores a waveform reproducing mode and waveform-reproduce-pitch control information. The waveform reproducing mode is data to select one out of four prepared waveform reproducing modes. The waveform-reproduce-pitch control information to control a pitch in waveform reproduction, as stated before.

The word 01h stores a waveform data first array head address/waveform address present value. This, prior to reproducing, is set with a head address of a first array by the CPU or the like and, during reproducing, holds an address present value of waveform data.

The word 02h stores a waveform data second array head address. This, prior to reproducing, is set with a head address of a second array by the CPU or the like and, during reproducing, holds a value.

The word 03h stores a waveform data bank address in its lower bytes and uses higher bytes as a waveform data cache. The present sound processor is accessible to a 24-bit address space, and the waveform data bank address represents an address of higher 8 bits. The waveform data bank address, together with the above waveform data first array head address/waveform address present value and waveform data second array head address, represent a 24-bit address. The waveform data cache is a space to temporarily hold waveform data acquired from the memory. In the case that the waveform data to be reproduced is stored in the same address as that in the last time, the waveform reading control circuit 35 acquires data from the waveform data cache instead of from the memory.

The word 04h stores channel volume, envelope mode and envelope pitch control information. The channel volume is to be outputted to the above-stated channel volume control DAC and control a volume over the channel 0. The envelope mode is data to select one out of four prepared envelope control modes. The envelope pitch control information is information to control a pitch of envelope, as stated before.

The word 05h stores an envelope data L head address and an address present value. This, prior to reproducing, is set with a head address of envelope data L by the CPU or the like and, during reproducing, holds an address present value of the envelope data L.

The word 06h stores an envelope data R head address and an address present value. This, prior to reproducing, is set with a head address of envelope data R by the CPU or the like and holds an address present value of the envelope data R.

The word 07h stores an envelope bank address and an envelope address present value (decimal portion). The envelope bank address represents an address of higher 8 bits of a 24-bit address, which, together with the above envelope data L head address and address present value and envelope data R head address and address present value, represent a 24-bit address. The envelope address present value (decimal portion) holds a result of accumulation upon pitch conversion, together with the envelope data L present value and envelope data R present value.

The word 08h is used as an envelope data L cache and an envelope data R cache. This holds the envelope data, to be next set, acquired from the memory by the envelope/preset control circuit.

The word 09h stores an envelope data L present value and an envelope data R present value.

The word 0Ah stores a waveform address present value (decimal portion). The waveform address present value (decimal portion), together with a waveform address present value, hold a result of accumulation upon pitch conversion.

The word 0Bh stores interrupt request signal timing. The interrupt request signal timing holds a result of accumulation to be performed using the ALU/accumulator 33 by the interrupt request signal circuit 37. When overflow occurs from here, the interrupt request signal circuit 37 generates an interrupt request signal.

Now, explanation will be made on a sound processing apparatus using the sound processor according to the invention.

Figure 11:
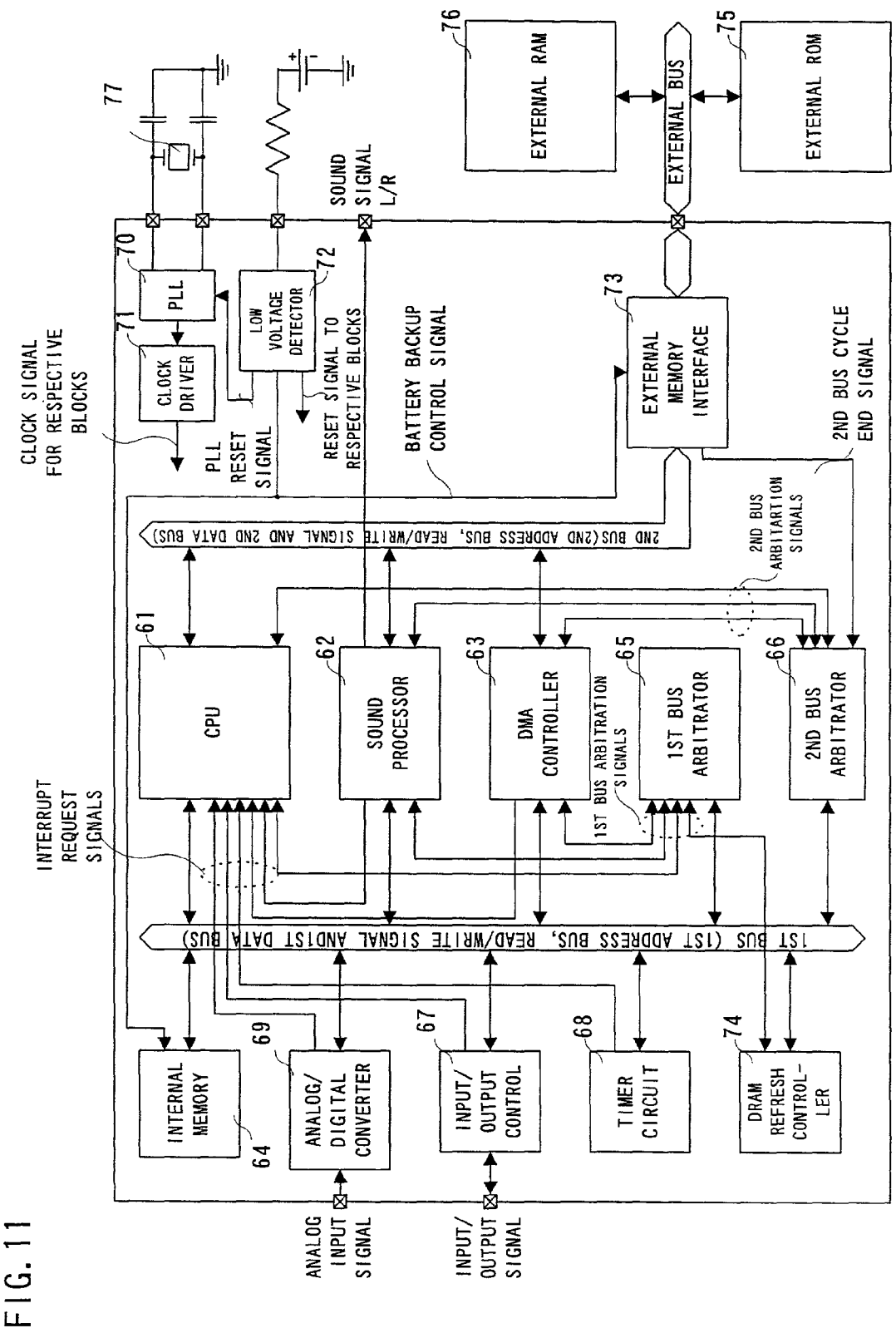
FIG. 11 is a schematic diagram of an essential part of a sound processing apparatus of the embodiment.

FIG. 11 shows an outline of an essential part of a sound processing apparatus according to the invention. The sound processing apparatus according to the present embodiment has a central processing unit (CPU) 61, a sound processor 62, a DMA controller 63, an internal memory 64, a first bus arbitrator 65, a second bus arbitrator 66, an input/output control circuit 67, a timer circuit 68, an analog/digital converter 69, a PLL circuit 70, a clock driver 71, a low voltage detector 72, an external memory interface 73 and, as required, a DRAM refresh controller 74.

Also, the present sound processing apparatus is further provided with a first bus comprising a 16-bit first address bus and read/write signals, a 8-bit first data bus, a second bus comprising a 24-bit second address bus and read/write signals, and an 8-bit second data bus.

The present sound processing apparatus externally requires one or more external ROM 75, as required one or more external RAM 76, an oscillator circuit formed by a quartz oscillator 77, etc., and a battery 78 as required to hold data of a static RAM (hereinafter abbreviated as SRAM).

Now, explanation is made on the functions of various parts of the present sound processing apparatus.

The CPU 61 performs various operations and controls over the system overall according to a program stored in the memory. The CPU 61 is a bus master of the first and second buses, and accessible to the resource connected to these buses.

The sound processor 62 uses the sound processor of the present embodiment as it is shown in FIG. 9. The sound processor 62 is a bus master on the first and second buses, which reads the data stored in the internal memory 64, external ROM 75 and external ROM 76 and produces and outputs a stereo sound signal L/R. The sound processor 62 is controlled by the CPU 61 through the first bus.

The DMA controller 63 administers data transfer of from the external ROM 75 or external RAM 76 to the internal memory 64. Also, this possesses a function to generate an interrupt request signal to the CPU, in order to notify completion of data transfer. The DMA controller 63 is a bus master on the first and second buses. The DMA controller 63 is controlled by the CPU 61 through the first bus.

The internal memory 64 has necessary one of among a mask ROM, an SRAM and a dynamic RAM (hereafter abbreviated as DRAM). Where SRAM data should be held by a battery, a battery 78 is necessary at an outside of the present sound processor apparatus. Where mounting a DRAM, memory content holding operation called refresh is required to perform periodically.

The first bus arbitrator 65 receives a first bus request signal from each bus master on the first bus, performs arbitration and issues a first bus grant signal to each bus master. By receiving a first bus grant signal, each bus master is permitted to access the first bus. The first bus request signal and first bus grant signal herein are shown as first bus arbitration signals in FIG. 11.

The second bus arbitrator 66 receives a second bus request signal from each bus master on the second bus, performs arbitration and issues a second bus grant signal to each bus master. Receiving a second bus grant signal, each bus master is permitted to access the second bus. The second bus request signal and second bus grant signal herein are shown as second bus arbitration signals in FIG. 11.

The input/output control circuit 67 performs communication or the like with an external input/output unit or external semiconductor device through an input/output signal. Input/output data is read/written by the CPU 61 through the first bus.

The timer circuit 68 has a function to generate an interrupt request signal to the CPU 61 based on a set time interval. The setting of time interval, etc. is performed by the CPU 61 through the first bus.

The analog/digital converter 69 converts an input voltage signal in analog level into a digital numeral. Also, this has a function to generate an interrupt request signal to the CPU 61 in order to notify completion of conversion. The converted data is read by the CPU through the first bus.

The PLL circuit 70 is configured by a phase locked loop (PLL) and produces a high frequency clock signal as multiplication of a sign wave signal obtained from the quartz oscillator 77 located outside the processor.

The clock driver 71 amplifies a high frequency clock signal received from the PLL circuit 70 into a sufficient signal intensity so that clock signals can be supplied to the functional blocks.

The low voltage detector 72 monitors on power voltage, and issues a reset signal to the PLL circuit 70 and reset signal to the system overall when the power voltage is lower than a predetermined constant voltage. Also, where the internal memory 64 or external RAM 76 is configured by an SRAM and data holding on the SRAM is required by a battery, a function is provided to issue a battery back up control signal while the power voltage is lower than a predetermined constant voltage.

The external memory interface 73 has functions of coupling the second bus to an external bus and issuing a second bus cycle end signal thereby controlling a second-bus bus cycle length.

The DRAM refresh controller 74 acquires unconditionally an available right to the first bus at a constant time interval and performs DRAM refresh operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound processor formed on a single semiconductor device to reproduce pulse-code-modulated sound waveform data, comprising:

sequence control means;

bus interface means for a common bus including an address bus and a data bus;

bus master means for issuing an address to said common bus through said bus interface means under control of said sequence control means, and reading and writing data for a resource connected to said common bus;

data holding means for holding part of data read out by said bus master means;

M sets (M being a natural number) of independent digital/analog converting means for converting digital data over a sound channel into an analog sound signal;

data output control means for controlling an output of data to said digital/analog converting means;

time division multiplexing means for time-division-multiplexing and outputting data of over N sets (N being a natural number greater than 2) of sound channels to each of digital/analog converting means required for reproduction, whereby data is to be simultaneously reproduced over a plurality of sets of sound channels represented by a product of M and N; and one main volume control digital/analog converter, wherein each of said M sets of digital/analog converting means is structured by one channel volume control digital/analog converter, one envelope control digital/analog converter, one sound waveform reproducing digital/analog converter and one waveform neutral point outputting digital/analog converter, said channel volume control digital/analog converters in the number of M being cascade-connected in parallel in a next stage to said main volume control digital/analog converter, in a next stage of which one envelope control digital/analog converter being cascade-connected, in a next stages of which one sound waveform reproducing digital/analog converter and one waveform neutral point outputting digital/analog converter being cascade-connected in parallel, further comprising first mixing means for mixing outputs of said sound waveform reproducing digital/analog converters in the number of M, and second mixing means for mixing outputs of said waveform neutral point outputting digital/analog converters in the number of M, said first and second mixing means having outputs respectively connected to two inputs of a differential amplifier provided at an inside or outside of said semiconductor device.

2. A sound processor according to claim 1, wherein said bus master means further has a function of determining whether data required in reproduction is stored in said data holding means or not, and acquiring the data from a resource connected to said common bus and storing the data in said data holding means where the data required in reproduction is not stored in said data holding means.

3. A sound processor according to claim 1, wherein said data output control means further has a function to control a constant period of a mute state between adjacent sound channels time-division-multiplexed.

4. A sound processor according to claim 3, wherein the mute state has a period to be set programmable.

5. A sound processor according to claim 1, wherein said data output means further has a function of outputting data in later timing, with respect to timing of outputting data to a certain digital/analog converter, to a digital/analog converter connected in a next stage thereto, and controlling timing of outputs to eliminate interference between time slots due to signal delay between said cascade-connected digital/analog converters when outputting data to said cascade-connected digital/analog converter.

6. A sound processor according to claim 5, wherein said data output control means is to be programmably set in timing of outputting data.

7. A sound processor according to claim 1, wherein sound waveform data is configured by two arrays having end codes provided at respective terminal ends of the arrays, and said bus master means further having a function to start reading at a head of the first array, uninterruptedly starting reading at a head of the second array immediately after reading the end code of the first array, and uninterruptedly starting reading at the head of the second array after reading out the end code of the second array.

8. A sound processor according to claim 1, further comprising accumulating means and means for storing pitch control information, wherein the pitch control information is read out at a constant time interval and accumulated by said accumulating means, and one part or the whole of an accumulation result being utilized as address information for access to a common bus of said bus master means.

9. A sound processor according to claim 1, wherein said bus interface means is provided independent for a plurality of common buses.

10. A sound processor according to claim 1, further comprising interrupt request control means to be controlled by said sequence control means and generate an interrupt request signal, wherein said bus master means comprises waveform reading control means to control reading of sound waveform data, envelope/preset control means to control reading out of parameters for controlling envelope data and sound reproduction, and access arbitrating means to arbitrate between an access of from said envelope/preset control means to the common bus and an access of from said waveform reading control means to the common bus, said bus interface means comprising first bus interface means to a first common bus, and second bus interface to a second common bus.

11. A sound processor apparatus, comprising:

being configured on one single semiconductor device, first and second buses having independent data transfer capabilities, a central processing unit and a sound processor according to claim 9 or 10 as bus masters for said first and second buses, a memory connected to said first bus, a first bus arbitrating means to administer arbitration over said first bus, and a second bus arbitrating means to administer arbitration over said second bus.

12. A sound processor formed on a single semiconductor device to reproduce pulse-code-modulated sound waveform data, comprising:

sequence control means;

bus interface means for a common bus including an address bus and a data bus;

bus master means for issuing an address to said common bus through said bus interface means under control of said sequence control means, and reading and writing data for a resource connected to said common bus;

data holding means for holding part of data read out by said bus master means;

M sets (M being a natural number) of independent digital/analog converting means for converting digital data over a sound channel into an analog sound signal;

data output control means for controlling an output of data to said digital/analog converting means;

time division multiplexing means for time-division-multiplexing and outputting data of over N sets (N being a natural number greater than 2) of sound channels to each of digital/analog converting means required for reproduction, whereby data is to be simultaneously reproduced over a plurality of sets of sound channels represented by a product of M and N; and one main volume control digital/analog converter, wherein each of said M sets of digital/analog converting means is structured by one channel volume control digital/analog converter, one first envelope control digital/analog converter, one second envelope control digital/analog converter, one first sound waveform reproducing digital/analog converter, one second sound waveform reproducing digital/analog converter, one first waveform neutral point outputting digital/analog converter and one second waveform neutral point outputting digital/analog converter, said channel volume control digital/analog converters in the number of M being cascade-connected in parallel in a next stage to said main volume control digital/analog converter, in a next stage of which said first envelope control digital/analog converter and said second envelope control digital/analog converter being cascade-connected in parallel, in a next stage to each of said first envelope control digital/analog converters said first sound waveform reproducing digital/analog converter and said first waveform neutral point outputting digital/analog converter each one in number being cascade-connected in parallel, in a next stage to each of said second envelope control digital/analog converters said second sound waveform reproducing digital/analog converter and said second waveform neutral point outputting digital/analog converter each one in number being cascade-connected in parallel, further comprising first mixing means for mixing outputs of said first sound waveform reproducing digital/analog converters in the number of M, and second mixing means for mixing outputs of said first waveform neutral point outputting digital/analog converters in the number of M, third mixing means for mixing outputs of said second sound waveform reproducing digital/analog converters in the number of M, and fourth mixing means for mixing outputs of said second waveform neutral point outputting digital/analog converters in the number of M, said first and second mixing means having outputs respectively connected to two inputs of a differential amplifier provided at an inside or outside of said semiconductors, said third and fourth mixing means having outputs respectively connected to two inputs of a differential amplifier provided at an inside or outside of said semiconductor device.

* * * * *